United States Patent
Sheafor et al.

(10) Patent No.: US 6,223,242 B1
(45) Date of Patent: Apr. 24, 2001

(54) LINEARLY EXPANDABLE SELF-ROUTING CROSSBAR SWITCH

(75) Inventors: Stephen J. Sheafor, Boulder; Christopher Koerner, Longmont; Bradford C. Lincoln; Robert Sugar, both of Boulder; Jonathan L. Huie, Lafayette, all of CO (US)

(73) Assignee: Sifera, Inc., Longmont, CO (US)

( * ) Notice: Subject to any disclaimer, the term of this patent is extended or adjusted under 35 U.S.C. 154(b) by 0 days.

(21) Appl. No.: 09/161,923

(22) Filed: Sep. 28, 1998

(51) Int. Cl.[7] .................................................. G06F 13/00
(52) U.S. Cl. ............................................ 710/132; 709/238
(58) Field of Search .................................... 709/238, 239; 710/131, 132

(56) References Cited

U.S. PATENT DOCUMENTS

| | | |
|---|---|---|
| 5,812,414 * | 9/1998 | Butts et al. ........................... 364/489 |
| 5,859,975 * | 1/1999 | Brewer et al. .................. 395/200.43 |
| 5,949,982 * | 9/1999 | Frankeny et al. ..................... 710/132 |
| 6,035,414 * | 3/2000 | Okazawa et al. ......................... 714/7 |
| 6,055,599 * | 4/2000 | Han et al. ............................. 710/132 |

OTHER PUBLICATIONS

F. Masetti and C. Raffaelli, Implementation Criteria for a High Speed Parallel Banyan Switch, 5/91, IEEE.

Setsuo Takahashi, Yasushi Fukuda, and Jun'ichirou Yanagi, Multi-Service ATM Node System, Aug. 1995, Hitachi Review, vol. 44, No. 4.

Nick McKeown et al, Tiny Tera: A Packet Switch Core, Jan./Feb. 1997, IEEE Micro.

* cited by examiner

*Primary Examiner*—David A Wiley
(74) *Attorney, Agent, or Firm*—Michael Pritzkau; Stephen Shear

(57) ABSTRACT

A crossbar routing arrangement is disclosed for use in a digital system having three or more buses. An associated method is also disclosed. The routing arrangement is configured for transferring a set of data received from any particular one of the buses to any other selected one of the buses and includes a control arrangement associated with each bus for dividing the set of data into at least first and second subsets of data and for adding self-routing signals to each data subset which signals identify the selected bus. A switching arrangement is configured for directing the first and second data subsets in a predetermined way responsive to the self-routing signals. The control arrangement cooperates with the switching arrangement to transfer the data subsets over physically distinct data transfer paths defined between the switching arrangement and the control arrangements. In accordance with one feature, the configuration of the routing arrangement provides for linear expansion whereby to service buses having increased width and/or to service an increased number of buses in a cost effective manner while, in either instance, maintaining high data throughput.

31 Claims, 6 Drawing Sheets

LINEARLY EXPANDABLE SELF-ROUTING CROSSBAR SWITCH

BACKGROUND OF THE INVENTION

The present invention relates generally to crossbar switching configurations and more particularly to a linearly expandable self-routing crossbar switch and associated method. The invention is applicable in any multi-source/multi-destination digital switching application including the fields of computer networking and digital telecommunications switching.

A number of different applications present the need for a switching arrangement which may be configured for routing a flow of data from a particular port to any one of a number of other ports which are connected with the switching arrangement. In the prior art, such switching arrangements are generally referred to as crossbar switches. FIG. 1 illustrates a four-port prior art crossbar switch, generally indicated by the reference numeral 10, which is capable providing a data flow path between two selected ones of any of four ports A, B, C or D. While the arrangement of FIG. 1 has proven to be effective for its intended use, it should also be appreciated that its capability for expansion is extremely limited.

FIG. 2 illustrates an overall crossbar switching arrangement, which is generally referred to by the reference numeral 20, that is made up of four of the crossbar switching arrangements 10a–d originally shown in FIG. 1. Arrangement 20 is configured for providing a data flow path between two selected ones of any of eight data ports A through H. While arrangement 20 serves its intended purpose, it should be appreciated that in order to double the number of ports served using the prior art four-port crossbar switch 10 of FIG. 1, the number of four-port crossbar switches 10 is multiplied by a factor of four.

As another example which is not illustrated, if sixteen ports (again doubling the number of ports) are to be served the number of prior art four-port crossbar switches would increase to sixteen. Thus, one of ordinary skill in the art should recognize that increasing the number of ports served results in a geometric increase in the required number of individual four-port cross-bar switches. This geometric expansion is particularly disadvantageous in terms of the hardware costs associated with expansion. Of course, a geometric expansion in terms of hardware results in a corresponding decrease in reliability of the overall switching arrangement. Another disadvantage stems from the fact that each additional layer of switches added to the overall arrangement adds latency (i.e., decreased data throughput based on time delays) in data routing operations.

The present invention solves the foregoing problems by providing a highly advantageous cross-bar switching arrangement which is expandable in a linear manner. An associated method is also provided.

SUMMARY OF THE INVENTION

As will be described in more detail hereinafter, there is disclosed herein a crossbar routing arrangement for use in a digital system having three or more buses. An associated method is also disclosed. This routing arrangement, like the crossbar switching arrangement of FIG. 2 is configured for transferring a set of data received from any particular one of the buses to any other selected one of the buses. However, the routing arrangement of the present invention includes a control arrangement associated with each bus for dividing the set of data into at least first and second subsets of data and for adding self-routing signals to each data subset which signals identify the selected bus. A switching arrangement is configured for directing the first and second data subsets in a predetermined way responsive to the self-routing signals. First and second input data transfer paths are provided between the control arrangement associated with the particular bus and the switching arrangement such that the first data subset can be transferred from the particular bus to the switching arrangement using the first input data transfer path and the second data subset can be transferred from the particular bus to the switching arrangement using the second input data transfer path. In addition, first and second output data transfer paths connect the switching arrangement with the control arrangement associated with the selected bus such that the first data subset can be transferred from the switching arrangement to the selected bus using the first output data transfer path and so that the second data subset can be transferred from the particular bus to the switching arrangement using the second output data transfer path. The switching arrangement directs the first and second data subsets in the aforementioned predetermined way by transferring the first and second data subsets from the first and second input data transfer paths to the first and second output data transfer paths, respectively.

In accordance with one feature, the configuration of the routing arrangement provides for linear expansion whereby to service buses having increased width and/or to service an increased number of buses in a cost effective manner while, in either instance, maintaining high data throughput.

In one aspect of the present invention, the data transfer paths over which the data subsets are transferred are physically distinct paths.

In another aspect of the invention, the switching arrangement includes at least first and second switching units. Transfer of the data subsets from the particular bus to the selected bus is accomplished by routing the first data subset through the first switching unit and the second data subset through the second switching unit.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 1:
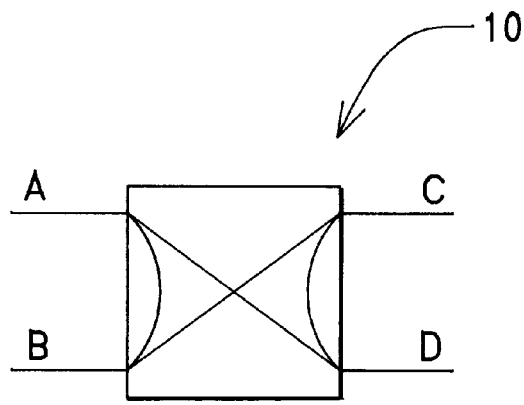
FIG. 1 is a diagrammatic representation, in block diagram form, of a prior art four port crossbar switch.
Figure 2:
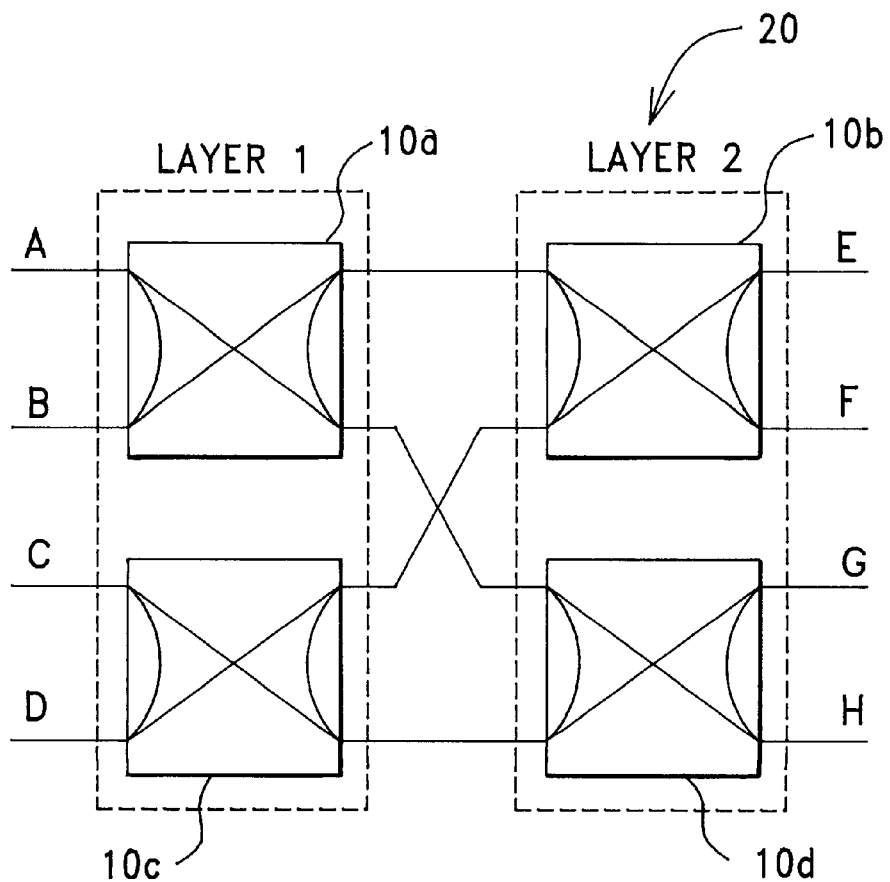
FIG. 2 is a diagrammatic representation, in block diagram form, of the manner in which an expanded art crossbar switching arrangement may be provided using a plurality of the four port switches shown in FIG. 1, shown here to illustrate a geometric increase in the number of switches required for a correspondingly doubled number of ports serviced and to illustrate the reason for latency added by the expansion.
Figure 3:
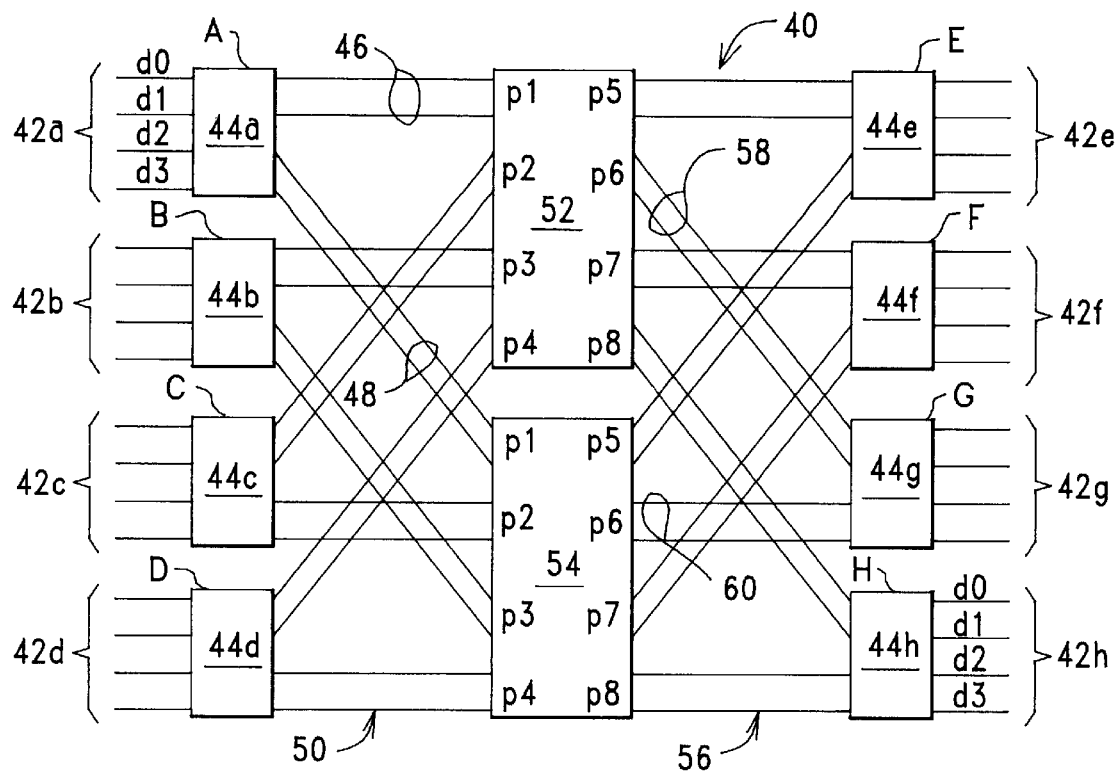
FIG. 3 is a diagrammatic representation, in block diagram form, of a first embodiment of a crossbar switching arrangement which is manufactured in accordance with the present invention and which serves four four-bit buses.

Having previously described FIGS. 1 and 2, attention is immediately directed to FIG. 3 which illustrates a first embodiment of a cross-bar switch arrangement manufactured in accordance with the present invention and generally indicated by the reference numeral 40. Like the arrangements of FIGS. 1 and 2, system 40 is configured for providing data path switching between two selected ones of at least three ports. In the present example, eight ports A–H are illustrated. Each port is connected with a bi-directional four bit bus that is indicated by the reference numbers 42a–h. Individual data lines are indicated as d0 to d3. While described herein as used with four bit buses, it should be appreciated that the present invention is suited for use with a bus configuration having any suitable width for reasons which will become apparent. In accordance with the present invention, a series of control arrangements 44a–h are provided in association with each of buses 42a–h, respectively. Specific details regarding the design of the control arrangements will be provided at an appropriate point below. For the moment, however, it is important to understand that the control arrangements are configured for associating the overall number of data lines d0–d3 which make up the width of each bus with two or more different data paths. In the present example, control arrangement 44a assigns data lines d0 and d1 of bus 42a to a data transfer path 46 and data lines d2 and d3 of bus 42a to a data transfer path 48. Thus, when a four bit set of data is received from bus 42a by control arrangement 44a, the set of data is divided into first and second subsets of data, each of which includes two bits for transfer via the respective data transfer paths.

Still referring to FIG. 3, data transfer paths 46 and 48 form a portion of a first interconnection mesh 50 of electrical conductors which extends from control arrangements 42a–d to first and second switching arrangements that are denoted by reference numbers 52a and 52b. In the present example, each switching arrangement is configured to include eight two-bit input/output ports p1–p8. It can be seen that the first interconnection mesh defines one data transfer path from each of the control arrangements to each switching arrangement. For example, path 46 is defined from control arrangement 44a to p1 of first switching arrangement 52a while path 48 extends from control arrangement 44a to p1 of switching arrangement 52b. At the same time, it can also be seen that a second interconnection mesh 56 extends between the switching arrangements and control arrangements 44e–h such that a data transfer path is defined from each one of control arrangements 44e–h to each one of switching arrangements 52a and 52b. For example, the second interconnection mesh defines a data path 58 between control arrangement 44g and p6 of switching arrangement 52a and a data path 60 between control arrangement 44g and p6 of switching arrangement 52b. The interconnection meshes are made up of suitable electrical conductors such as, for example, printed circuit board traces or coaxial cables.

Figure 4:
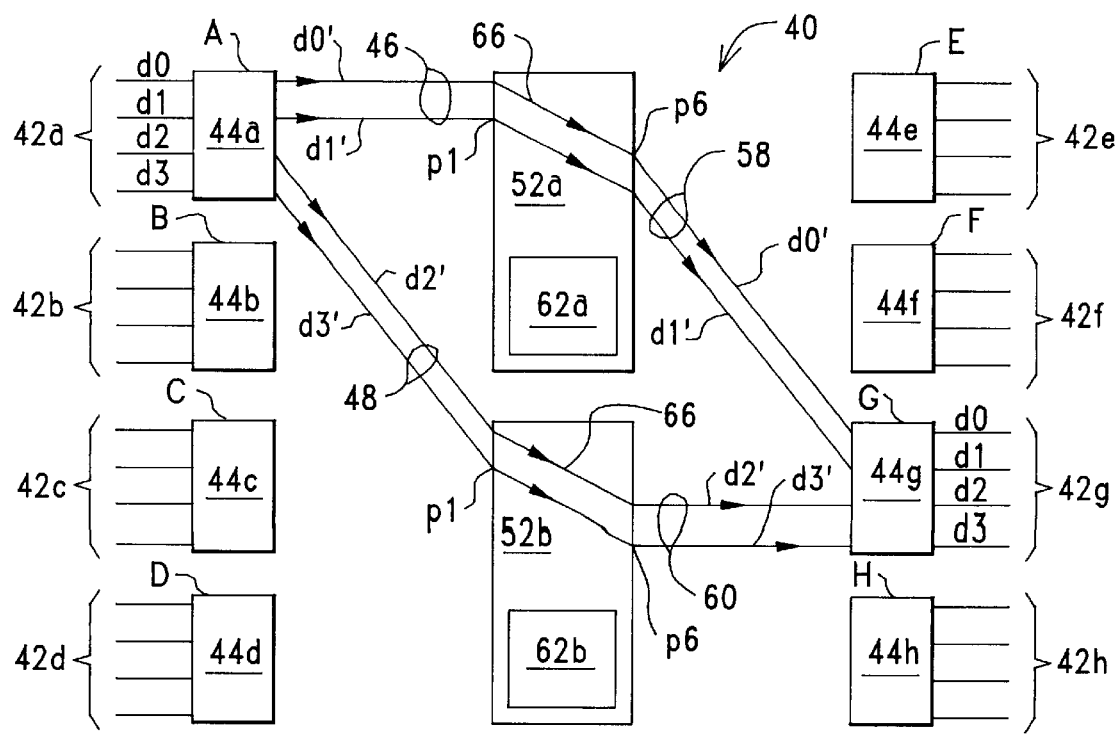
FIG. 4 is a partial diagrammatic representation, in block diagram form, of the embodiment of FIG. 3 illustrating a data transfer performed between two data buses in accordance with the present invention.

Turning to FIG. 4 in conjunction with FIG. 3 and having generally described the structure of crossbar switching arrangement 40, a general understanding will now be provided as to its operation. FIG. 4 specifically illustrates the transfer of a set of data originally received from bus 42a to bus 42g. This data will be indicated using data line reference numbers d0–d3 preceded by the word "data" for purposes of simplicity. After having passed through a control arrangement, the data is indicated as data d0'–d3'. During the transfer of this set of data, the control arrangement adds control or self-routing information (not shown) to each data subset to be routed. That is, information is added to each data subset which at least identifies a destination bus for the original set of data, as will be described at an appropriate point below.

As described above, data d0 and d1 are transferred as a first data subset using path 46 while data d2 and d3 are transferred as a second data subset using path 48. Upon receipt of these data subsets, switching arrangements 52a and 52b read the self-routing information provided with each data subset using configuration arrangements 62a and 62b, respectively. In response to the self-routing information, configuration arrangements 62a and 62b cooperate with the remaining portions of their respective switching arrangements 52a or 52b to automatically provide a data path 66 from p1 to p6 whereby to route the data subsets through the switching arrangements. It should be mentioned that, in this instance, switching arrangements 52a and 52b (including configuration arrangements 62a and 62b) may advantageously be identical since the switching arrangements always configure in an identical manner based on the self-routing information. This advantage is attributable to the layout of interconnection meshes 50 and 56. However, it should be appreciated that interconnection meshes may be laid out in any number of different ways based, most particularly, on the number of bits in each data subset. Therefore, configuration arrangements 62a and 62b may also include circuitry for identifying one of a number of possible locations within an overall crossbar configuration. For example, such location identification circuitry may include a dip switch (not shown) wherein the setting of the dip switch identifies one of a number of possible interconnection meshes. In this manner, a single switching arrangement may be useful with a wide range of different interconnection meshes. For this reason, such a configuration feature is highly advantageous with regard to expansion of existing crossbar switching arrangements since existing hardware may readily be used with a different interconnection mesh arrangement by simply adjusting the dip switch setting.

It should also be mentioned that the switching arrangements may be required to configure in a unique way based upon their particular location within an overall crossbar switching arrangement. That is, based upon a selected location within an overall array of possible locations, a dip switch or other such similar means may readily identify each one of the possible locations. This additional configuration feature, either alone or in combination with the mesh identification feature described immediately above, is also highly advantageous with regard to expansion of existing crossbar switching arrangements by providing the ability to reuse existing hardware through the simple expedient of adjusting a dip switch setting or, for example, the physical wiring of a pin.

Still referring to FIGS. 3 and 4, after routing through switching arrangements 52a and 52b, data d0' and d1' are transferred from switching arrangement 52a to control arrangement 44g on data transfer path 58 while data d2' and d3' are transferred from switching arrangement 52b to control arrangement 44g on data transfer path 60. Thereafter, control arrangement 44g recomposes the original set of data from the first and second data subsets using d0'–d3' into d0–d3 and places this original set of data onto bus 42g. It is important to note that care must be taken to insure proper arrival of data at a destination bus, particularly in view of the fact that the data subsets are routed over physically different paths. That is, placement of data onto a destination bus should not occur prior to arrival of all of the data subsets which make up that data set. Such timing concerns may be handled, for example, by synchronizing FIFO memories on each data line. In addition to aforementioned advantages of the present invention, further advantages will be made evident within the context of the remaining discussions.

In view of the rapid growth of digitally based information/ communication systems, there is a frequent need to replace or expand preexisting crossbar switching installations. One of skill in the art will appreciate that crossbar switching arrangements are typically expanded in one of two basic ways. A first type of expansion relates to adding more buses between which it is desired to switch data. The second type of expansion relates to adding more width i.e., data lines to each bus. The latter type will be described immediately hereinafter in relation to the teachings of the present invention. It should also be appreciated that both types of expansion may be performed simultaneously. However, the present examples are limited to describing each separately for purposes of clarity. It is considered that, in view of the teachings herein, one of ordinary skill in the art may readily execute a combination of both types of crossbar expansion.

Figure 5:
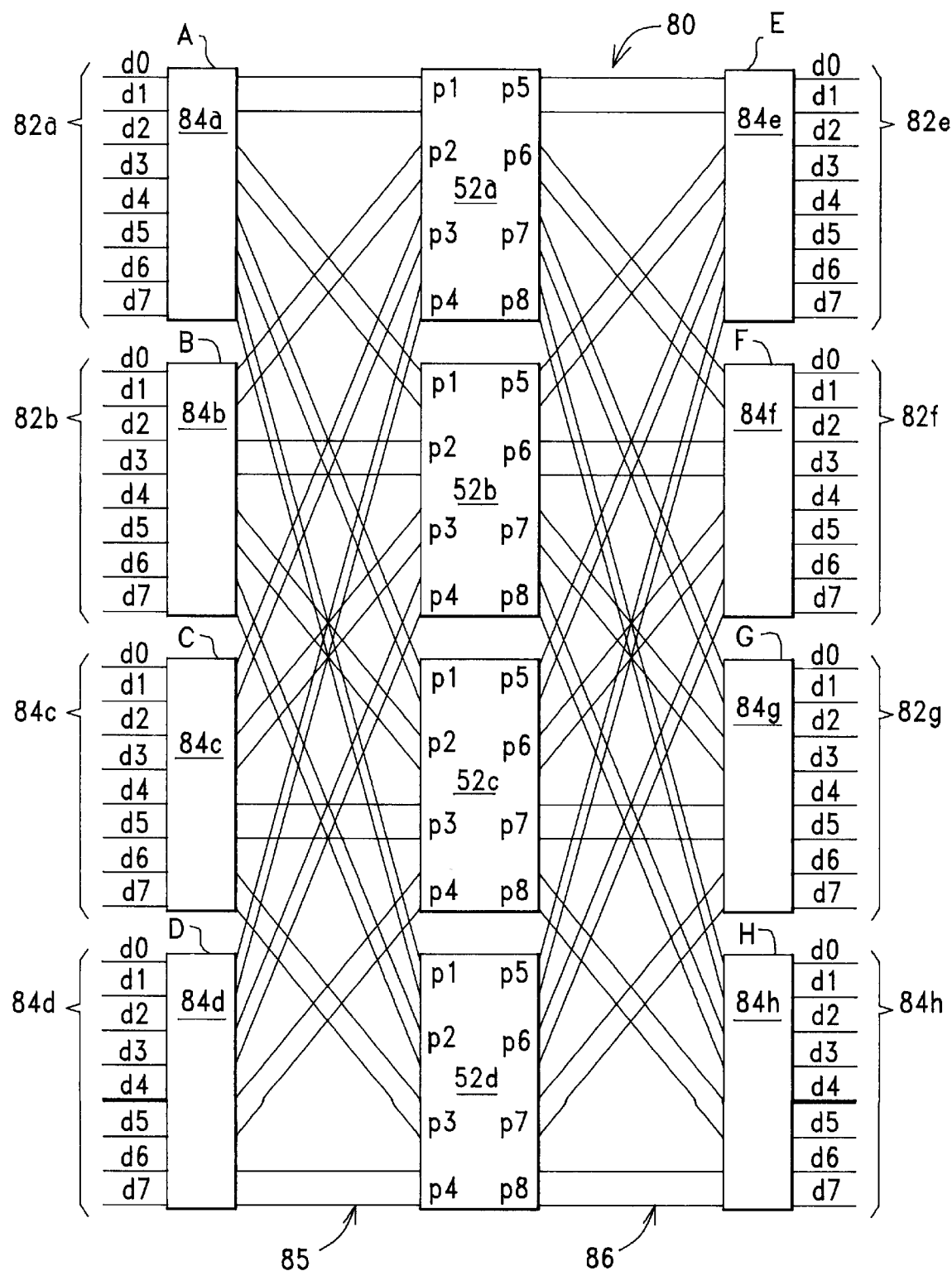
FIG. 5 is a diagrammatic representation, in block diagram form, of a second embodiment of a crossbar switching arrangement which is manufactured in accordance with the present invention and which may represent an expanded version of the first embodiment of FIG. 3 in which eight eight-bit buses are served, as opposed to four four-bit buses.

Turning now to FIG. 5, a second embodiment of a crossbar switch arrangement manufactured in accordance with the present invention is generally indicated by the reference numeral 80. Since crossbar arrangement 80, and another arrangement yet to be described, may include certain components which are identical to components of previously described crossbar arrangement 40, like reference numbers are applied wherever possible throughout the various figures and the reader is referred to descriptions of these components appearing above. Like previously described crossbar arrangement 40, crossbar arrangement 80 is configured for providing data path switching between two selected ones of at least three ports. Specifically, eight ports A–H are illustrated. However, in this example, each port is connected with a bi-directional eight bit bus, as indicated by the reference numbers 82a–h. Individual data lines which make up the buses are indicated as d0 to d7. A series of control arrangements 84a–h are provided in association with each of buses 82a–h, respectively, with specific details regarding the design of the control arrangements to be provided at an appropriate point below.

Still referring to FIG. 5, crossbar arrangement 120 advantageously includes switching arrangements 52a–b of FIGS. 3 and 4. A first interconnection mesh 85 is comprised of suitable electrical conductors and extends between control arrangements 84a–d and switching arrangements 52a–d while a second interconnection mesh 86, also comprised of suitable electrical conductors, extends between control arrangements 84e–h and switching arrangements 52a–d. As in arrangement 40, it is important to note that each interconnection mesh defines one data transfer path between each control arrangement 84 and each switching arrangement 52. In this instance, the data transfer paths include two data lines, as will be further described.

Figure 6:
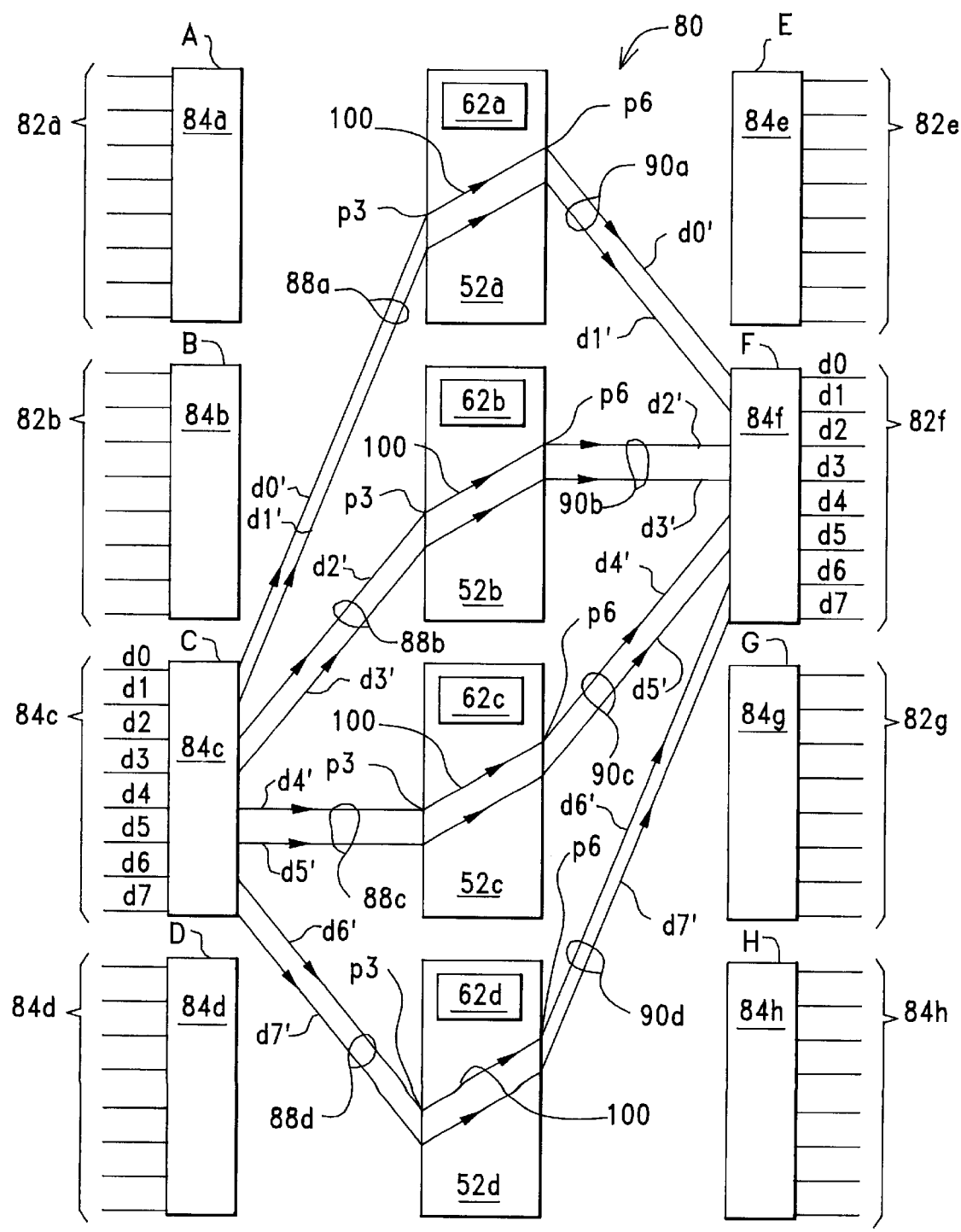
FIG. 6 is a partial diagrammatic representation, in block diagram form of the embodiment of FIG. 5 illustrating a data transfer performed between two of the eight-bit data buses in accordance with the present invention.

Turning to FIG. 6 in conjunction with FIG. 5, an example serving to illustrate the operation of crossbar arrangement 80 will now be presented in which a set (i.e., a byte) of data is received from bus 82c for routing to bus 82f. FIG. 6 specifically illustrates the transfer of a set of data originally received from bus 82c to bus 82f which will be indicated using data line reference numbers d0–d7 preceded by the word "data", as in the previous example. Thus, a bit of data transferred on the d0 line of, for example, bus 82c is referred to as "data d0". After having passed through a control arrangement, the data is indicated as data d0'–d7'. Portions of both interconnection meshes not used in the present example have been eliminated in FIG. 6 for purposes of clarity. Portions of the meshes illustrated in FIG. 6 include data transfer paths 88a–d defined between control arrangement 84c and switching arrangements 52a–d and data transfer paths 90a–d defined between control arrangement 84f and switching arrangements 52a–d.

In accordance with the present invention, control arrangements 84 are configured for associating data lines d0–d7 of the respective buses with associated data transfer paths, four of which paths originate/end at each control arrangement. Therefore, like crossbar arrangement 40, crossbar arrangement 80 utilizes two bit data subsets wherein each data transfer path includes a pair of data transfer lines. In the present example, control arrangement 84a assigns data lines d0 and d1 of bus 82c to a data transfer path 88a, data lines d2 and d3 to a data transfer path 88b, data lines d4 and d5 to a data transfer path 88c and data lines d6 and d7 to a data transfer path 88d. Thus, the eight bits of received data are transferred in first, second, third and fourth data subsets on the respective data transfer paths.

Like the control arrangements of crossbar arrangement 40, control arrangements 84 add control or self-routing signals, as will be described at an appropriate point below, to each data subset to be routed so as to at least identify a destination bus for the original set of data. Upon receipt of these data subsets, switching arrangements 52a–d read the self-routing information provided with each data subset using configuration arrangements 62a–d, respectively. In response to the self-routing information, configuration arrangements 62a–d cooperate with their respective switching arrangements 52a–d to automatically provide a data path 100 from p3 to p6 whereby to route the data subsets through the switching arrangements 62. It should be mentioned again that, due to the layout of interconnection meshes 85 and 86, switching arrangements 52a–d, including their respective configuration arrangements 62, may be identical since the switching arrangements configure in an identical manner based on the self-routing information. Therefore, it should be appreciated that the switching arrangements 52 used in crossbar switch 40 may be used directly and without modification in crossbar arrangement 80, illustrating just one aspect of the highly advantageous expansion capabilities of the present invention.

Still referring to FIGS. 5 and 6, after routing through switching arrangement 52a, data d0' and d1' are transferred to control arrangement 84f on data transfer path 90a, data d2' and d3' are transferred from switching arrangement 52b to control arrangement 84f on data transfer path 90b, data d4' and d5' are transferred from switching arrangement 52c to control arrangement 84f on data transfer path 90c and data d6' and d7' are transferred from switching arrangement 52d to control arrangement 84f on data transfer path 90d. Thereafter, control arrangement 84f assembles the original set of data from the four data subsets into data d0–d7 and places this original set of data onto bus 82f. Once again, it is important to note that care must be taken to insure proper timing with regard to arrival of the data subsets at a destination bus, as previously mentioned, since the data subsets are routed over physically different paths.

Figure 7:
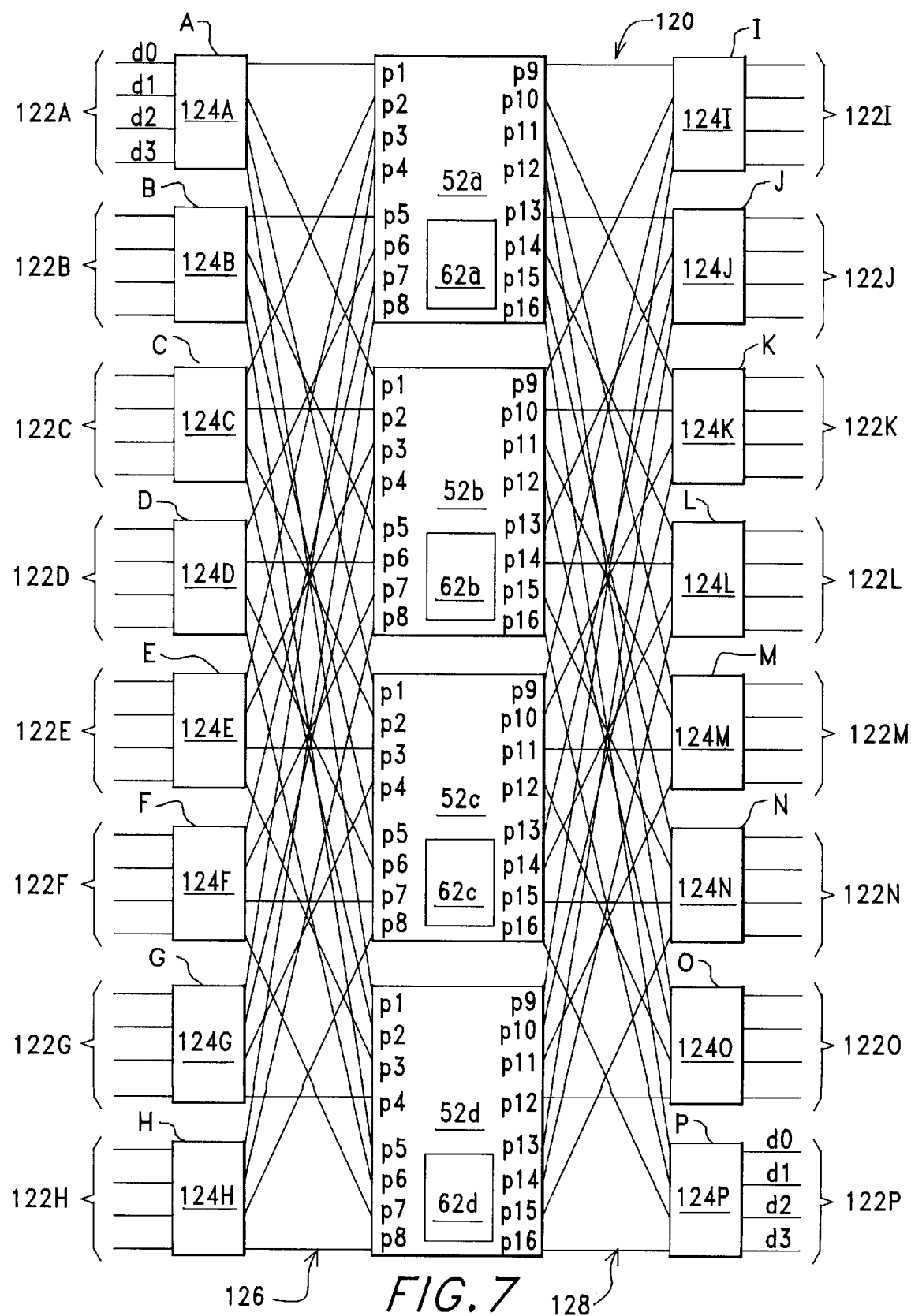
FIG. 7 is a diagrammatic representation, in block diagram form, of a third embodiment of a crossbar switching arrangement which is manufactured in accordance with the present invention and which may represent an expanded version of the first embodiment of FIG. 3 in which sixteen four-bit buses are served, as opposed to four four-bit buses.

With reference to FIG. 7, having described a first way in which crossbar switching installations are typically expanded, attention is now directed to a second way in which such systems are typically expanded. To that end, a crossbar switching arrangement manufactured in accordance with the present invention is generally indicated by the reference numeral 120. Lie previously described embodiments, arrangement 120 is configured for providing data path switching between two selected ones of at least three ports. In the present example, sixteen ports A–P are illustrated with each port being associated with one of sixteen bi-directional four bit buses, as indicated by the reference numbers 122A–P. Individual data lines which make up the buses are indicated as d0 to d3. A series of control arrangements 124A–P are provided in association with each port.

Still referring to FIG. 7, crossbar arrangement 120 also includes aforementioned switching arrangements 52a and 52b of FIG. 3 and two additional, but identical switching arrangements 52c and 52d (all of which are also used in arrangement 80 of FIG. 5). A first interconnection mesh 126 is comprised of suitable electrical conductors and extends between control arrangements 122A–H and switching arrangements 52a–d while a second interconnection mesh 128, also comprised of suitable electrical conductors, extends between control arrangements 124I–P and switching arrangements 52a–d. As in previous embodiments, each interconnection mesh defines one data transfer path between each control arrangement 124 and each switching arrangement 52.

Figure 8:
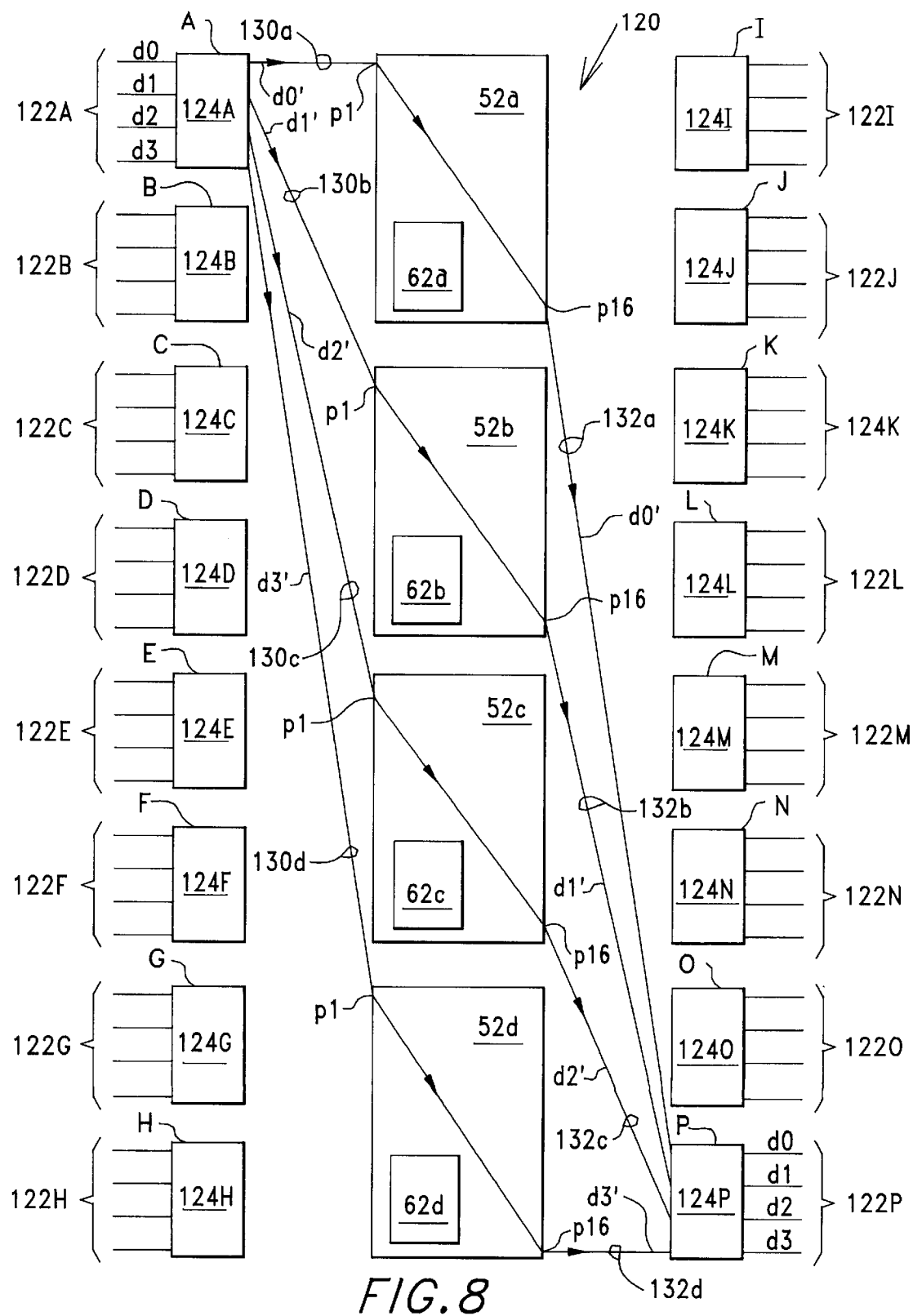
FIG. 8 is a partial diagrammatic representation, in block diagram form, of the embodiment of FIG. 7 illustrating a data transfer performed between two of the four-bit data buses in accordance with the present invention.

Attention is now directed to FIG. 8 in conjunction with FIG. 7 wherein FIG. 8 is a diagrammatic illustration of the transfer of a set of data (i.e., 4 bits comprised of data d0–d3) initially received from bus 122A to bus 122P. As in previous examples, the data is indicated as data d0'–d3' after passing through one of the control arrangements onto an interconnection mesh. Once again, portions of both interconnection meshes not used in the present example have been eliminated in FIG. 8 for purposes of clarity. FIG. 8 specifically illustrates data transfer paths 130a–d defined between control arrangement 122A and switching arrangements 52a–d and data transfer paths 132a–d defined between control arrangement 84f and switching arrangements 52a–d, for purposes of the present example.

In accordance with the present invention, control arrangements 124 are configured for assigning incoming data from the buses to the data transfer paths in a predetermined way. Specifically, one bit of each incoming set of data is transferred over each data transfer path. For example, data d0 is transferred as data d0' over data transfer path 130a to switching arrangement 52a. Thus, crossbar arrangement 120 utilizes single bit data subsets, with four data subsets for each data bus. The remaining data lines d1, d2 and d3 of bus 122A are assigned to data transfer paths 130b–d, respectively, as d1', d2' and d3'.

Control or self-routing signals are added to each data subset or bit, in this instance, to be routed so as to at least identify a destination bus for the original set of data. Upon receipt of these data subsets, switching arrangements 52a–d read the self-routing information provided with each data subset using configuration arrangements 62a–d, respectively. In response to the self-routing information, switching arrangements 52a–d configure to automatically provide a data path 134 from p1 to p16 whereby to route the single bit data subsets through the switching arrangements. Once again, due to the layout of interconnection meshes 126 and 128, switching arrangements 52a–d, including their respective configuration arrangements, may be identical since the switching arrangements configure in an identical manner based on the self-routing information. Therefore, the same switching arrangements used in the preceding examples may be reused in the present example. The only provision needed to facilitate the reuse of the switching arrangements in crossbar arrangement 120 is to set configuration arrangements 62, for example, by using a dip switch (not shown) or other suitable means for the overall crossbar arrangement of FIGS. 7 and 8 wherein each switching arrangement is configured having sixteen single bit ports, illustrating, once again, the highly advantageous expansion capabilities of the present invention.

Still referring to FIGS. 7 and 8, after routing through switching arrangement 52a data d0' is transferred to control arrangement 122P on data transfer path 132a; data d1' is transferred to control arrangement 122P on data transfer path 132b via control arrangement 52b; data d2' is transferred to control arrangement 122P on data transfer path 132c via control arrangement 52c; and data d3' is transferred to control arrangement 122P on data transfer path 132d via control arrangement 52d. Thereafter, control arrangement 124P assembles the original set of data from the four single bit data subsets into data d0–d3 and places this original set of data onto bus 122P.

Having provided three descriptions of crossbar switching arrangements manufactured in accordance with the present invention, a discussion will now be provided with regard to at least one highly advantageous feature which is realized by the implementation of a crossbar switching arrangement in accordance with the teachings of the present invention. The significance of this feature is best appreciated with a brief return to the discussions appearing above relating to FIG. 2. Specifically, in the prior art, expansion of a crossbar switching arrangement generally requires a geometric expansion in the amount of hardware required to provide the required switching capability. In contrast, the present invention provides a linearly expandable crossbar switching arrangement as clearly illustrated by the examples of FIGS. 5–8. The linear expandability feature is applicable with regard to expansion of an existing crossbar switching installation by either increasing the width of the buses which are serviced or by increasing the overall number of individual bus arrangements serviced.

In view of the preceding examples, it should be appreciated that the linear expansion feature is implemented, in the first instance, by providing the capability to divide the width of a data bus into two or more separately transferable data subsets. In the second instance, with the provision of self-routing data, the capability is provided to transfer the data subsets over physically different transfer paths. Specifically, in the examples disclosed herein, a four bit bus was divided in one embodiment into two two-bit data subsets and, in another embodiment, into four one-bit data subsets. In still another embodiment, an eight bit bus was divided into four two-bit data subsets. However, an eight bit data bus may just as readily be divided into eight one-bit data subsets such that each data bit is routed to one of eight different switching arrangements. The limit of linear expandability is, therefore, reached once a bus is divided into single bit data subsets within the context of the present invention. However, it should be appreciated that a crossbar switching arrangement using eight-bit buses may, in this manner, serve to route data between sixteen eight-bit bi-directional buses using only four of switching arrangements 52, as used throughout the various examples. In comparison, when prior art crossbar switching arrangements having four ports are used to expand to a sixteen port system, a total of sixteen four-port switching arrangements are needed. Thus, the present invention reduces additional hardware required by a factor of four. Moreover, another advantage provided by the present invention resides in the capability of reusing hardware in existing installations for purposes of crossbar switching arrangement expansion.

As evidenced by the previous examples, selection of data subset size for a particular application should be based on factors including the number of buses being served and the width of these data buses.

While the aforementioned advantages are significant, it is also important to understand that the present invention is highly advantageous with regard to performance capabilities of crossbar switching arrangements, particularly with regard to latency. In the prior art, many crossbar switching arrangements are comprised of multiple switching "layers". For example, prior art crossbar switching arrangement 20 of FIG. 2 requires layer 1 and layer 2 of four port switches. Each layer adds latency in terms of routing data through the crossbar arrangement. In comparison, a crossbar switching arrangement manufactured in accordance with the present invention comprises only one "layer" of switching arrangements thereby reducing latency to what is thought to be a minimum even in expanded systems. While it may be suggested that latency is added by the addition of self-routing information, Applicants have demonstrated that latency resulting from adding self-routing information is essentially insignificant as compared with the latency which results from multiple switching "layers", as seen in the prior art. Applicants submit that the combination of self-routing information with a divisible bus structure has not been seen heretofore and results in a remarkable and sweeping improvement in crossbar switching technology.

Having described various implementations and advantages provided by the present invention, specific details will now be provided regarding design details. In addition, the following examples will further demonstrate the expansion capabilities of the present invention by considering expansion wherein eight bit buses are used in each example. While separate figures specific to these examples have not been provided, it is considered that previous discussions and figures serve as an adequate framework for these examples. Moreover, one of the examples is specifically illustrated by the implementation of FIG. 4, as will be mentioned.

In one, preferred implementation of the crossbar switching arrangements of the present invention, the data to be transferred by the control arrangement is a packet of bytes. In accomplishing this transfer, an initial control arrangement receiving data. from one of the buses receives the number of bytes required to compose a byte packet. Thereafter, the initial control arrangement then adds data which selects the destination of the byte packet, i.e. which control arrangement is to receive the packet. In the present examples, a four bit value is used such that one of sixteen possible destination control arrangements can be identified. Each byte of the byte packet is separated into its eight component bits which comprise the data subsets. The bytes of the byte packet are numbered B0, B1, . . . , B7, and the bits of each byte are designated as B0(0), B0(1), . . . , B0(7), B1(0), etc. The four bits which select the destination control arrangement are designated D(0) through D(3).

Each control arrangement has two separate eight bit interfaces over which the data subsets flow, one for input and one for output. Each bit of an interface consists of a data wire and a clock wire, such that one bit of data is sent on the data wire during each clock period of the clock wire. When a byte packet is to be transmitted, it is separated into eight data subsets, one of which is to be sent over each of the wires of the output interface. The first data subset will consist of the bit stream D(0), D(1), D(2), D(3), B0(0), B1(0), B2(0), . . . , B7(0). The second data subset will consist of the bit stream D(0), D(1), D(2), D(3), B0(0), B1(1), B2(1), . . . , B7(1), and so on for the other data subsets. Thus each data subset contains the routing information necessary to determine the destination.

Each switching arrangement has sixteen connections (sixteen inputs and sixteen outputs). When a switching arrangement receives a bit stream on one of its input connections, it removes the first four bits (D(0) through D(3)) and uses them to select one of its output connections, based on the configuration as selected by a group of dip switches. The remaining bits of the stream are then transmitted on that output connection, from which they are received by the selected destination control arrangement.

In this instance, since the switching arrangements are all identical, each of the data subsets is routed identically. Thus, the destination control arrangement receives a series of eight bit streams, the first being B0(0), B1(0), . . . , Bn(0), the second being B0(1), B1(1), . . . , Bn(1), and so on. Each bit stream is fed into a small FIFO running on the clock wire of the corresponding bit of the interface. The FIFO's and are then synchronized to the master clock of the destination control arrangement to produce the resulting byte packet, which is identical to the originally transmitted one.

Three system configurations are possible serving as expansion examples, each configuration has a different interconnection mesh arrangement and a different configuration selection for the switching arrangement, but the components are identical. In each case the selector made up of D(3), D(2), D(1) and D(0) is considered a number D, with values from 0 to 15.

The first configuration uses two switching arrangements, S0 and S1, to connect four control arrangements, C0 through C3 wherein one of four eight-bit buses is connected to each control arrangement. The buses are denoted as B1–B3. Four bits of each switching arrangement are connected to each of the four control arrangements. Table 1 shows the connections.

TABLE 1

| Control Arrangement | Bus/Bit | Switching Arrangement | 0 | Control Arrangement | Bus/Bit | Switching Arrangement | Bit |
|---|---|---|---|---|---|---|---|
| C0 | B0/0 | S0 | 0 | C2 | B2/0 | S0 | 8 |
| C0 | B0/1 | S0 | 1 | C2 | B2/1 | S0 | 9 |
| C0 | B0/2 | S0 | 2 | C2 | B2/2 | S0 | 10 |
| C0 | B0/3 | S0 | 3 | C2 | B2/3 | S0 | 11 |
| C0 | B0/4 | S1 | 0 | C2 | B2/4 | S1 | 8 |
| C0 | B0/5 | S1 | 1 | C2 | B2/5 | S1 | 9 |
| C0 | B0/6 | S1 | 2 | C2 | B2/6 | S1 | 10 |
| C0 | B0/7 | S1 | 3 | C2 | B2/7 | S1 | 11 |
| C1 | B1/0 | S0 | 4 | C3 | B3/0 | S0 | 12 |
| C1 | B1/1 | S0 | 5 | C3 | B3/1 | S0 | 13 |
| C1 | B1/2 | S0 | 6 | C3 | B3/2 | S0 | 14 |
| C1 | B1/3 | S0 | 7 | C3 | B3/3 | S0 | 15 |
| C1 | B1/4 | S1 | 4 | C3 | B3/4 | S1 | 12 |
| C1 | B1/5 | S1 | 5 | C3 | B3/5 | S1 | 13 |
| C1 | B1/6 | S1 | 6 | C3 | B3/6 | S1 | 14 |
| C1 | B1/7 | S1 | 7 | C3 | B3/7 | S1 | 15 |

For the bit stream coming in, the port which it is switched to is selected as P=B+4*D, where P is the output port number, B is the bit number of the input port modulo 4, and D is the destination selector. Note that since there are only four control arrangements, the only valid values for D are 0 through 3. It is also important to note that one feature of the present invention resides in the capability of a control A second configuration uses four switching arrangements S0 through S3 to connect eight control arrangements C0 through C7 wherein one of eight eight-bit buses is connected to each control arrangement. Two bits of the switching arrangement are connected to each of the eight control arrangements. Table 2 shows the connections.

TABLE 2

| Control Arrangement | Bit | Switching Arrangement | 0 | Control Arrangement | Bit | Switching Arrangement | Bit |
|---|---|---|---|---|---|---|---|
| C0 | 0 | S0 | 0 | C5 | 0 | S0 | 8 |
| C0 | 1 | S0 | 1 | C5 | 1 | S0 | 9 |
| C0 | 2 | S1 | 0 | C5 | 2 | S1 | 8 |
| C0 | 3 | S1 | 1 | C5 | 3 | S1 | 9 |
| C0 | 4 | S2 | 0 | C5 | 4 | S2 | 8 |
| C0 | 5 | S2 | 1 | C5 | 5 | S2 | 9 |
| C0 | 6 | S3 | 0 | C5 | 6 | S3 | 8 |
| C0 | 7 | S3 | 1 | C5 | 7 | S3 | 9 |
| C1 | 0 | S0 | 2 | C6 | 0 | S0 | 10 |
| C1 | 1 | S0 | 3 | C6 | 1 | S0 | 11 |
| C1 | 2 | S1 | 2 | C6 | 2 | S1 | 10 |
| C1 | 3 | S1 | 3 | C6 | 3 | S1 | 11 |
| C1 | 4 | S2 | 2 | C6 | 4 | S2 | 10 |
| C1 | 5 | S2 | 3 | C6 | 5 | S2 | 11 |
| C1 | 6 | S3 | 2 | C6 | 6 | S3 | 10 |
| C1 | 7 | S3 | 3 | C6 | 7 | S3 | 11 |
| C2 | 0 | S0 | 4 | C7 | 0 | S0 | 12 |
| C2 | 1 | S0 | 5 | C7 | 1 | S0 | 13 |
| C2 | 2 | S1 | 4 | C7 | 2 | S1 | 12 |
| C2 | 3 | S1 | 5 | C7 | 3 | S1 | 13 |
| C2 | 4 | S2 | 4 | C7 | 4 | S2 | 12 |
| C2 | 5 | S2 | 5 | C7 | 5 | S2 | 13 |
| C2 | 6 | S3 | 4 | C7 | 6 | S3 | 12 |
| C2 | 7 | S3 | 5 | C7 | 7 | S3 | 13 |
| C3 | 0 | S0 | 6 | C8 | 0 | S0 | 14 |
| C3 | 1 | S0 | 7 | C8 | 1 | S0 | 15 |
| C3 | 2 | S1 | 6 | C8 | 2 | S1 | 14 |
| C3 | 3 | S1 | 7 | C8 | 3 | S1 | 15 |
| C3 | 4 | S2 | 6 | C8 | 4 | S2 | 14 |
| C3 | 5 | S2 | 7 | C8 | 5 | S2 | 15 |
| C3 | 6 | S3 | 6 | C8 | 6 | S3 | 14 |
| C3 | 7 | 53 | 7 | C8 | 7 | S3 | 15 | arrangement to transfer data from its output connection back to its own input connection, which may be useful in some cases. For example, control arrangement C0, serving as port A, may transfer a byte packet from port A through the switching arrangement with which it is connected and back to port A.

For an incoming bit stream, the port to which it is switched to is selected as P=B+2*D where P is the output port number, B is the bit number of the input port modulo 2, and D is the destination selector. Note that since there are only four control arrangements, the only valid values for D are 0 through 7.

A fourth configuration uses eight switching arrangements to connect sixteen control arrangements C0 through C15 wherein each control arrangement is connected to one of sixteen eight-bit buses. One bit of the switching arrangement is connected to each of the sixteen control arrangements. The connection mesh can be extrapolated from the Table 2 pattern. For the bit stream coming in, the port to which it is switched to is selected as P=D, where P is the output port number and D is the destination selector. Note that since there are sixteen control arrangements, all values of D are valid.

As can be seen from the three immediately foregoing crossbar configurations, the number of switching arrangements expands linearly with a linear increase in the number of buses in a highly advantageous way. Moreover, the control arrangements and switching arrangements are identical in each every configuration, with only the switching arrangement configuration and the interconnection mesh changing between the various combinations.

The physical realization of the structure of the above configurations/implementations is typically contemplated to be in the form of an integrated circuit which contains one switching arrangement. The control arrangement would be part of an integrated circuit which includes other logic for receiving and transmitting packets of data to and from a communications network, and logic for processing those packets and determining the appropriate destination circuit.

With regard to the all of the examples described above, it is to be understood that crossbar switching arrangements manufactured in accordance with the present invention are configured for routing data from any one of the ports served to any other selected port served. The present examples have described the transfer of data between ports on opposite sides of the switching arrangements and in one direction for purposes of clarity only. The reader should appreciate that data transfers may just as readily be performed between ports on the same side of the switching arrangements or in a direction opposite that shown.

It should be understood that the routing/crossbar switching arrangement and associated method of the present invention may be embodied in many other specific forms and produced by other methods without departing from the spirit or scope of the present invention. Therefore, the present examples are to be considered as illustrative and not restrictive, and the invention is not to be limited to the details given herein, but may be modified within the scope of the appended claims.

What is claimed is:

1. In a digital system including at least three buses, a routing arrangement for transferring a set of data received from any particular one of the buses to any other selected one of the buses, said routing arrangement comprising:
   a) a control arrangement associated with each bus for dividing said set of data into at least first and second subsets of data and for adding self-routing signals to each data subset which signals identify the selected bus;
   b) a switching arrangement for directing the first and second data subsets in a predetermined way responsive to said self-routing signals;
   c) first and second input data transfer paths connecting the control arrangement associated with the particular bus to the switching arrangement such that said first data subset can be transferred from the particular bus to the switching arrangement using said first input data transfer path and said second data subset can be transferred from the particular bus to the switching arrangement using said second input data transfer path; and
   d) first and second output data transfer paths connecting the switching arrangement with the control arrangement associated with the selected bus such that said first data subset can be transferred from said switching arrangement to said selected bus using said first output data transfer path and so that said second data subset can be transferred from the particular bus to the switching arrangement using said second output data transfer path, said switching arrangement directing the first and second data subsets in said predetermined way by transferring the first and second data subsets from said first and second input data transfer paths to said first and second output data transfer paths, respectively.

2. The routing arrangement of claim 1 wherein said switching arrangement includes at least two separate switching units and wherein each data subset passes through a different one of said switching units.

3. The routing arrangement of claim 1 wherein said first and second input data transfer paths form one portion of a first interconnection mesh extending between said switching arrangement and a first group of said control arrangements which includes the control arrangement associated with said particular bus, and wherein said first and second output data paths form one portion of a second interconnection mesh extending between said switching arrangement and a second group of said control arrangements which includes the control arrangement associated with said selected bus.

4. The routing arrangement of claim 3 wherein said second interconnection mesh is a mirror image of said first interconnection mesh.

5. The routing arrangement of claim 3 wherein said switching arrangement includes at least two separate switching units each of which may occupy one of a plurality of positions within said switching arrangement and each of which includes means for identifying a particular configuration of the first and second interconnection meshes selected from a plurality of different interconnection mesh configurations so as to properly route the data subsets which pass through that switching unit for the particular configuration of the first and second interconnection meshes.

6. The routing arrangement of claim 1 wherein said switching arrangement includes at least two separate switching units each of which may occupy one of a plurality of positions within said switching arrangement and each of which includes means for identifying a particular position where the switching unit is actually located so as to properly route the data subsets which pass through that switching unit at that particular location.

7. The routing arrangement of claim 6 wherein said plurality of positions define a linear array such that the switching arrangement is linearly expandable.

8. The routing arrangement of claim 1 wherein said switching arrangement includes at least two individual switching units and wherein said first input data transfer path and said first output data transfer path are connected with a first one of the switching units and said second input data transfer path and said second output data transfer path are connected with a second one of the switching units.

9. The routing arrangement of claim 1 wherein said set of data received from said particular bus is received on a plurality of data lines and wherein first and second input data transfer paths and said first and second output data transfer paths each include a predetermined number of said data lines.

10. The routing arrangement of claim 9 wherein said self-routing signals are transferred using the predetermined number of data lines associated with each data path.

11. The routing arrangement of claim 9 wherein the predetermined number of data lines in each data transfer path is two data lines.

12. The routing arrangement of claim 9 wherein the predetermined number of data lines in each data transfer path is one data line.

13. The routing arrangement of claim 1 wherein said control arrangement includes a clock line for each data transfer path and wherein the receipt of all of the data subsets which make up the set of data is coordinated at said selected bus using the clock lines.

14. In a digital system including at least three buses, a routing arrangement for transferring a set of data received from any particular one of the buses to any other selected one of the buses, said routing arrangement comprising:
 a) a control arrangement associated with each bus for dividing said set of data into at least first and second subsets of data and for adding self-routing signals to each data subset which signals identify the selected bus; and
 b) a switching arrangement connected with the control arrangement associated with said particular bus by at least first and second input data transfer paths and connected with the control arrangement associated with the selected bus by at least first and second output data transfer paths such that said first data subset can be transferred from the particular bus to the switching arrangement using said first input data transfer path and from said switching arrangement to said selected bus using said first output data transfer path, and such that said second data subset can be transferred from the particular bus to the switching arrangement using said second input data transfer path and from said switching arrangement to said selected bus using said second output data transfer path, said switching arrangement including means responsive to said self-routing signals for directing said first and second data subsets from said first and second input data transfer paths to said first and second output data transfer paths, respectively.

15. The arrangement of claim 14 wherein said switching arrangement includes at least two separate switching units and wherein each data subset passes through a different one of said switching units.

16. The routing arrangement of claim 14 wherein said first and second input data transfer paths form one portion of a first interconnection mesh extending between said switching arrangement and a first group of said control arrangements which includes the control arrangement associated with said particular bus, and wherein said first and second output data paths form one portion of a second interconnection mesh extending between said switching arrangement and a second group of said control arrangements which includes the control arrangement associated with said selected bus.

17. The routing arrangement of claim 16 wherein said second interconnection mesh is a mirror image of said first interconnection mesh.

18. The routing arrangement of claim 16 wherein said switching arrangement includes at least two separate switching units each of which may occupy one of a plurality of positions within said switching arrangement and each of which includes means for identifying a particular configuration of the first and second interconnection meshes selected from a plurality of different interconnection mesh configurations so as to properly route the data subsets which pass through that switching unit for the particular configuration of the first and second interconnection meshes.

19. The arrangement of claim 14 wherein said switching arrangement includes at least two separate switching units each of which may occupy one of a plurality of different locations within said switching arrangement and each of which includes means for identifying a particular location among the different locations so as to properly route the data subsets which pass through that switching unit at that particular location.

20. The arrangement of claim 19 wherein said plurality of locations define a linear array such that the switching arrangement is linearly expandable.

21. The arrangement of claim 14 wherein said switching arrangement includes at least two individual switching units and wherein said first input data transfer path and said first output data transfer path are connected with a first one of the switching units and said second input data transfer path and said second output data transfer path are connected with a second one of the switching units.

22. The arrangement of claim 14 wherein said set of data received from said particular bus is received on a plurality of data lines and wherein first and second input data transfer paths and said first and second output data transfer paths each include a predetermined number of said data lines.

23. The arrangement of claim 22 wherein said self-routing signals are transferred using the predetermined number of data lines associated with each data path.

24. The arrangement of claim 22 wherein the predetermined number of data lines in each data transfer path is two data lines.

25. The arrangement of claim 22 wherein the predetermined number of data lines in each data transfer path is one data line.

26. The arrangement of claim 14 wherein said control arrangement includes a clock line for each data transfer path and wherein the receipt of all of the data subsets which make up the set of data is coordinated at said selected bus using the clock lines.

27. In a digital system including at least three buses, a method of routing a set of data received from any particular one of the buses to any other selected one of the buses, said method comprising the steps of:
 a) dividing said set of data into at least first and second subsets of data;
 b) adding self-routing signals to each data subset to at least identify the selected bus;
 c) providing a switching arrangement for directing the first and second data subsets in a predetermined way responsive to said self-routing signals;
 d) forming an input set of data transfer paths between said particular bus and said switching arrangement and an output set of data transfer paths between the switching arrangement and the selected bus; and
 e) routing the data subsets from said particular bus to said switching arrangement using at least two different ones of said input data transfer paths associated with said particular bus;
 f) reading said self-routing data using said switching arrangement and, thereafter, using the self-routing data to configure the switching arrangement such that the switching arrangement directs the data subsets from the input data transfer paths associated with the particular bus to at least two different ones of the output data transfer paths associated with the selected bus; and
 g) transferring the data subsets from the switching arrangement to the selected bus over the output data transfer paths associated with the selected bus.

28. The method according to claim 27 wherein said switching arrangement includes at least two separate switching units each of which may occupy one of a plurality of different locations within said switching arrangement and wherein each data subset is routed through a different one of said switching units.

29. The method according to claim 28 wherein each switching unit includes means for identifying a particular location among the different locations and wherein each switching unit automatically configures itself using its particular identified location so as to properly route the data subsets which pass through that switching unit.

30. The method according to claim 27 wherein said output set of data transfer paths is configured as a mirror image of said input set of data transfer paths.

31. The method according to claim 27 wherein said step of forming the input and output data transfer paths includes the step of selecting a particular path configuration for the input and output data transfer paths from a plurality of available path configurations and said method further includes the step of configuring the witching arrangement based upon the selected path configuration.

* * * * *